United States Patent
Hsiao

(10) Patent No.: US 6,894,852 B1
(45) Date of Patent: May 17, 2005

(54) OPTICAL DEVICE

(75) Inventor: Chun-I Hsiao, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/781,776

(22) Filed: Feb. 20, 2004

(51) Int. Cl.$^7$ .............................. G02B 23/00; G02B 5/04
(52) U.S. Cl. ......................... 359/834; 359/431; 359/857
(58) Field of Search ..................... 359/431, 831–837, 359/850–861, 599; 385/133, 147; 324/96; 362/31

(56) References Cited

U.S. PATENT DOCUMENTS

| | | | | | |
|---|---|---|---|---|---|
| 4,996,632 | A | * | 2/1991 | Aikens | 362/560 |
| 5,245,175 | A | * | 9/1993 | Inabata | 250/201.8 |
| 5,583,428 | A | * | 12/1996 | Meier | 324/96 |
| 6,324,330 | B1 | * | 11/2001 | Stites | 385/133 |
| 6,587,286 | B1 | * | 7/2003 | Townsend | 359/833 |
| 6,741,410 | B2 | * | 5/2004 | Plank et al. | 359/834 |

* cited by examiner

Primary Examiner—Thong Q Nguyen
(74) Attorney, Agent, or Firm—Rabin & Berdo, P.C.

(57) ABSTRACT

An optical device uses in a plane image input device. The optical device comprises a body including an incident end and an emergent end. After a light beam enters the body via the incident end, undergoes a total reflection, and emerges from the emergent end. Thus, the size of the plane image input device can be minimized and the optical energy attenuation can be reduced during the transmission process.

9 Claims, 4 Drawing Sheets

OPTICAL DEVICE

BACKGROUND OF THE INVENTION

1. Field of Invention

The invention relates to an optical device used in plane image input devices such as scanners or printers.

2. Related Art

Aside from drawing, video conferencing, multimedia and computer briefing, digital information is also important in business documents. Although paperless offices have not been realized, scanning has been used to generate electronic documents in business to reduce the use of paper.

The scanner has been a common input device because its operation is very simple. One only needs to open its lid, places the original document on its glass, and then covers the lid back. The rest is left to its operating software to control the scanning job.

The basic principle of the scanner is using a mechanical or electronic scanning module to read image points on the original document and then converting the points into a digital form. Since it casts light on the surface of the original document and converts the reflected brightness into digital information, it is called the photoelectric conversion. During the process that the image sensor reads the image signal on the original document, the light emitted from an illuminating source projects onto the surface of the original document. The light reflected by the original document goes through a lens to form an image on the sensor. Through the photoelectric conversion, it is converted into an output voltage proportional to the density of the image.

In recent years, all electronic devices become more compact, so are the scanners. However, the reflector for reflecting light forbids the minimization of the scanner volume. Therefore, it is an important issue how to minimize the volume of the scanning module. In addition to scanners, other plane image input devices such as printers also have similar problems.

SUMMARY OF THE INVENTION

An objective of the invention is to provide an optical device to minimize the plane image input device and to reduce optical energy attenuation during the transmission process.

The disclosed optical device is used in a plane image input device. The optical device has a body including an incident end and an emergent end. After a light beam enters the body, it undergoes a total reflection inside the body and leaves the body from the emergent end. The body further includes a first reflector, a second reflector, a third reflector, a fourth reflector, a first junction surface, and a second junction surface. The first reflector connects to the incident end and to the first junction surface at an angle of 135 degrees. The second reflector connects to the emergent end and to the third reflector at an angle of 90 degrees. The second junction surface connects to the third reflector and to the fourth reflector at an angle of 135 degrees. The fourth reflector connects to the incident end.

When in use, a beam of light enters the body via the incident end, undergoes an internal total reflection, and emerges from the emergent end. The internal total reflection is achieved by totally reflecting the light from the first reflector to the second reflector, to the third reflector, to the fourth reflector, to the first reflector, and finally emerging from the emergent end. Therefore, using the disclosed optical device in a plane image input device can reduce its overall size and optical energy attenuation during the optical transmission.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Common plane image input devices include scanners and printers. Taking the scanner as an example, the reflector for reflecting the light beam from an illuminating source in its internal scanning module often forbids the scanner size from becoming smaller. Other plane image input devices have similar problems. The invention thus discloses an optical device that reduces the size of the plane image input device and the optical energy attenuation during its transmission.

Figure 1:
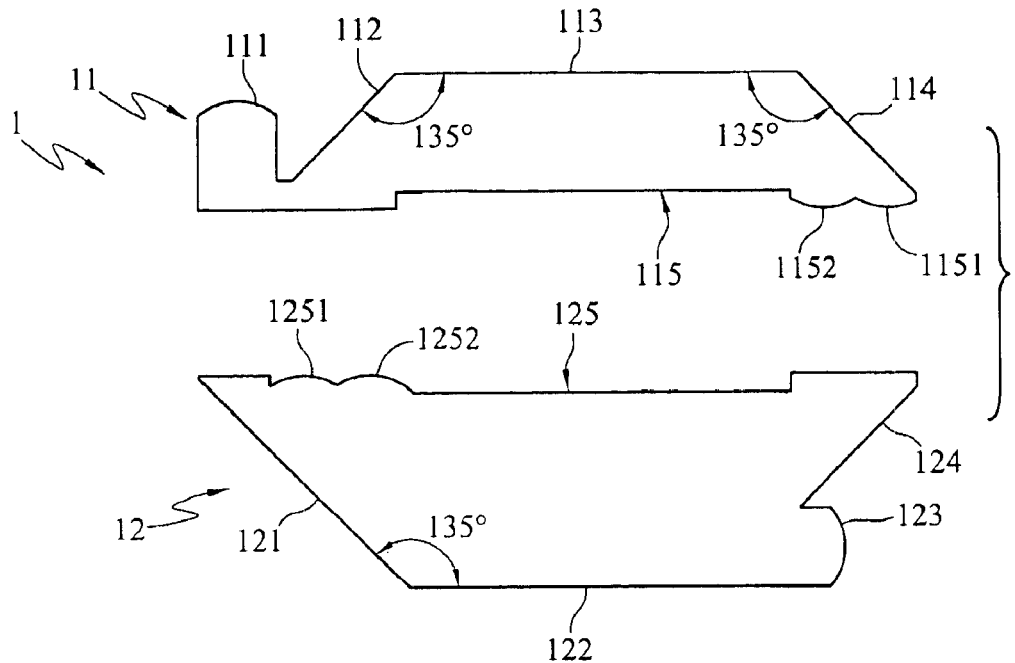
FIG. 1 is an exploded view of a first embodiment of the invention.

As shown in FIG. 1, the disclosed optical device consists of a body 1, including a first device 11 and a second device 12 (contrary to the integral body shown in FIGS. 5–8). The first device 11 includes an incident end 111, a fourth reflector 112, a second junction surface 113, a third reflector 114, and a first touching surface 115. The incident end 111 is a convex surface, connecting to the fourth reflector 112. The second junction surface 113 connects to the fourth reflector 112 at an angle of 135 degrees and to the third reflector 114 at an angle of 135 degrees too. The first touching surface 115 connects to the incident end 111 and the third reflector 114. The second device 12 includes a first reflector 121, a first junction surface 122, an emergent surface 123, a second reflector 124, and a second touching surface 125. The first reflector 121 connects to the first junction surface 122 at an angle of 135 degrees. The first junction surface 122 connects to the convex emergent end 123. The second reflector 124 connects to the emergent end 123 and to the second touching surface 125. The second touching surface 125 includes several convex surfaces 1251, 1252. The convex surfaces 1251, 1252 correspond to the first touching surface 115 which is flat. The first touching surface 115 also has several convex surfaces 1151, 1152. Likewise, the convex surfaces 1151, 1152 corresponds to the second touching surface 125 which is flat.

Figure 2:
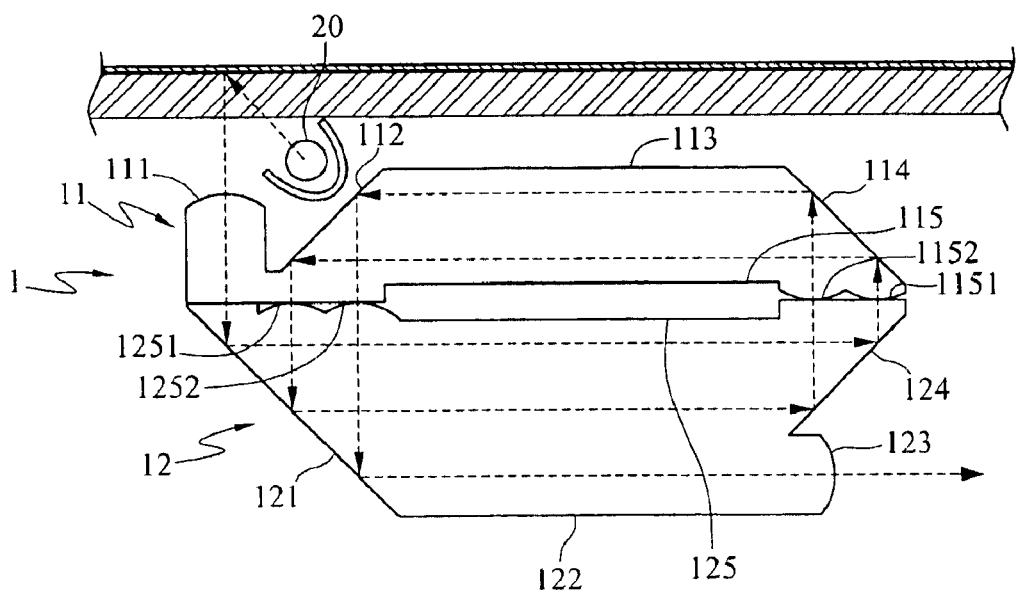
FIG. 2 shows how the first embodiment works.

FIG. 2 shows how the optical device disclosed in the first embodiment works. The optical device corresponds to an illuminating source 20 of the plane image input device. The first touching surface 115 of the first device 11 touches the second touching surface 125 of the second device 12 so that light emitted from the illuminating source 20 is reflected to enter the body 1 via the incident end 111. After an internal total reflection, the light beam emerges from the emergent end 123. In detail, after the light beam enters the body 1 via the incident end 111, it is reflected by the first reflector 121 to the second reflector. After being reflected by the second reflector 124, the light beam goes through the convex surface 1151 to the third reflector 114. After being reflected by the third reflector 114 to the fourth reflector 112, the light beam goes through the convex surface 1251 to the first reflector 121. Going through in order the second reflector 124, the convex surface 1152, the third reflector 114, the fourth reflector 112, the convex surface 1252, and the first reflector 121, the light beam finally emerges from the emergent end 123. Therefore, using the disclosed optical device in a plane image input device can reduce its size and optical energy attenuation.

Figure 3:
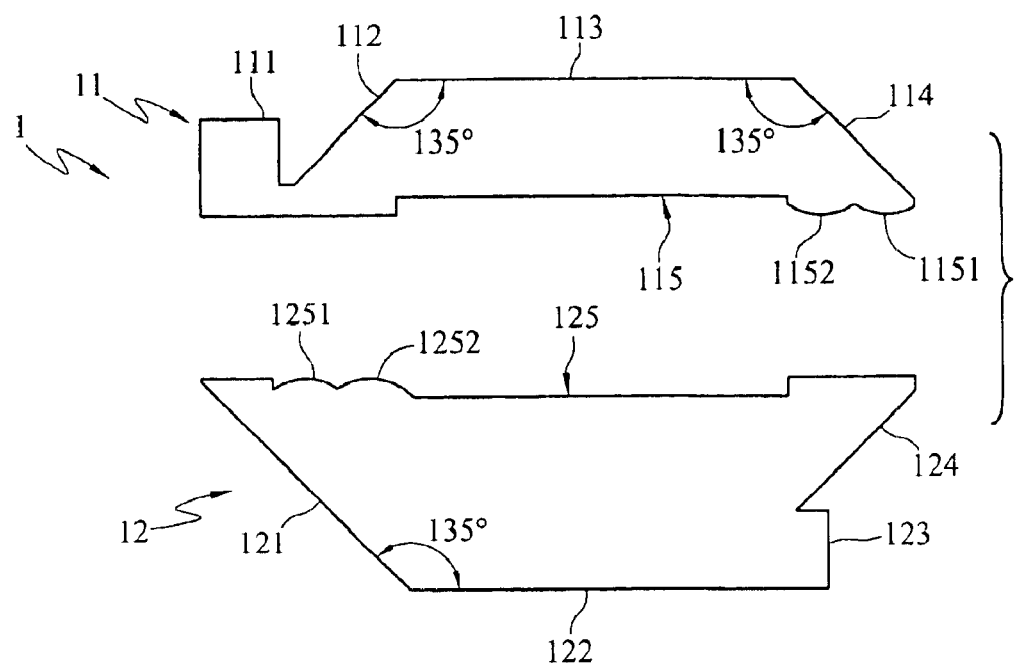
FIG. 3 is an exploded view of a second embodiment of the invention.
Figure 4:
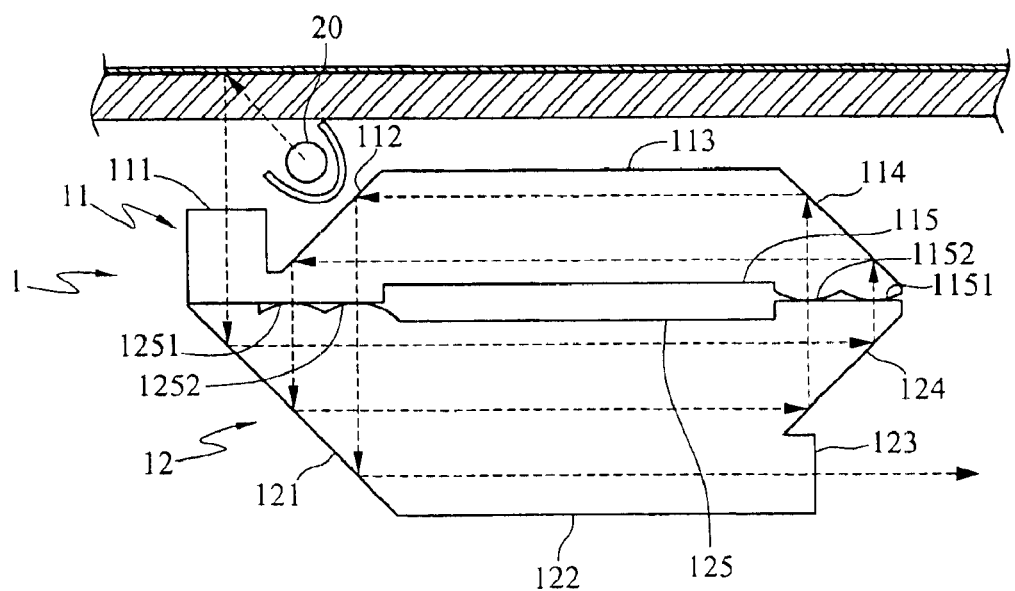
FIG. 4 shows how the second embodiment works.

FIG. 3 shows an exploded view of the optical device in a second embodiment of the invention. FIG. 4 shows how the second embodiment works. From the drawings, one sees that the incident end 111 and the emergent end 123 can be either convex as in the previous embodiment or planar, both achieving the same effects.

Figure 5:
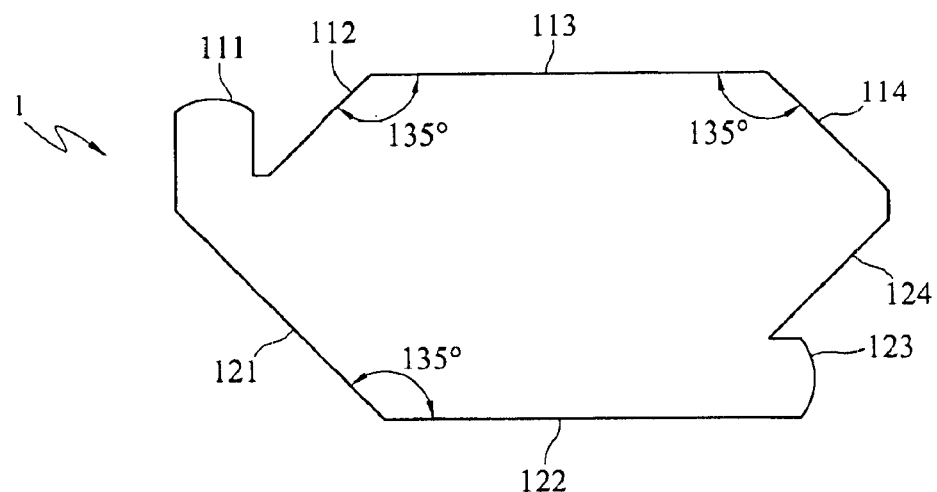
FIG. 5 is an exploded view of a third embodiment of the invention.
Figure 6:
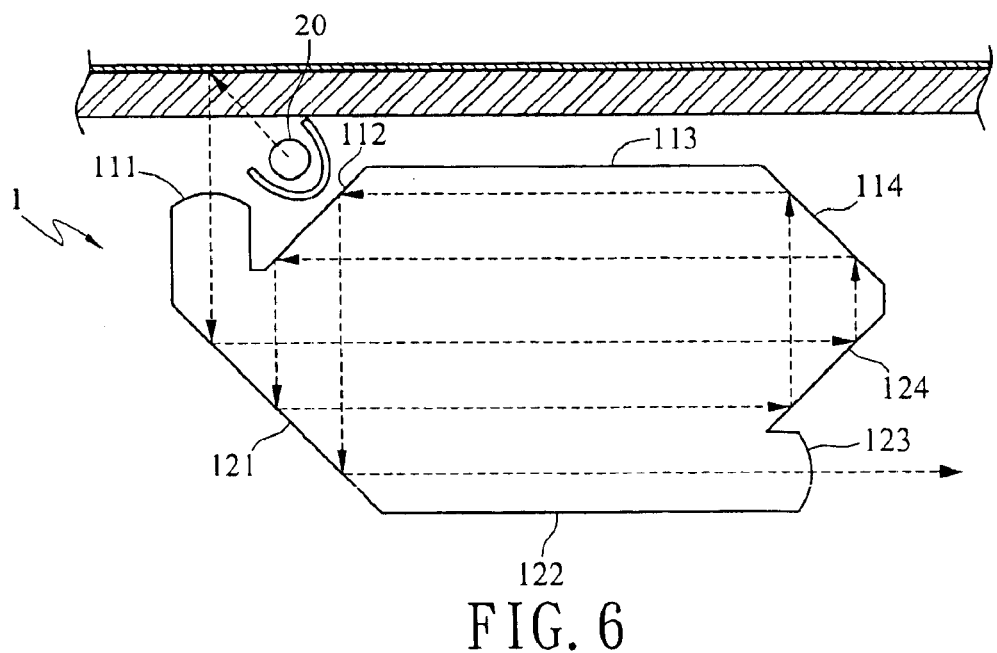
FIG. 6 shows how the third embodiment works.

FIG. 5 is a schematic view of a third embodiment of the invention, and FIG. 6 shows how the third embodiment works. In the embodiment, the optical device is a single object. That is, it does not have the above-mentioned first touching surface 115 and second touching surface 125. The first reflector 121 connects to the incident end 111, and the second reflector 124 connects to the third reflector 114. When in use, the light beam experiences the same reflections, but without going through the convex surfaces 1251, 1252, 1151, 1152. Using the disclosed optical device in a plane image input device can effectively reduce its size and optical energy attenuation.

Figure 7:
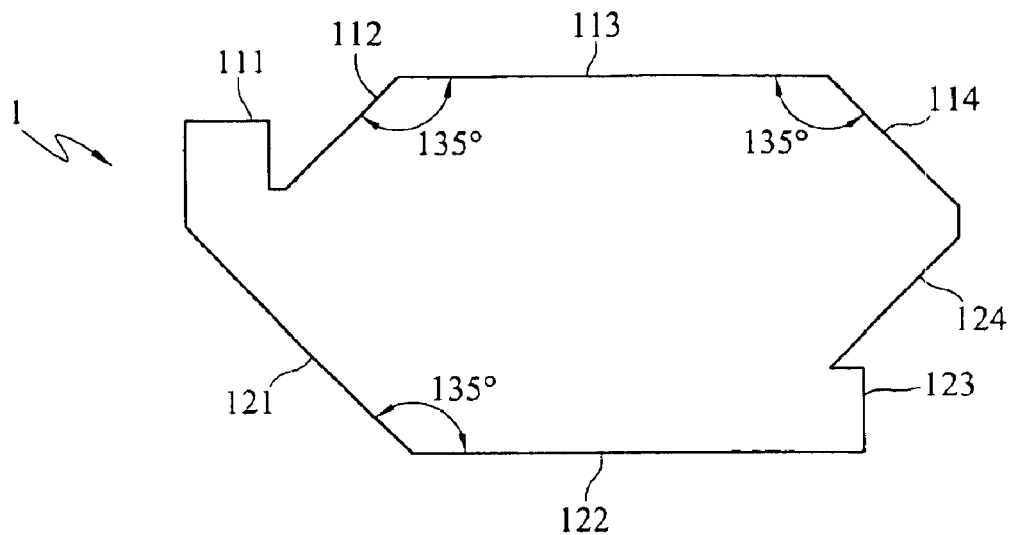
FIG. 7 is an exploded view of a fourth embodiment of the invention.
Figure 8:
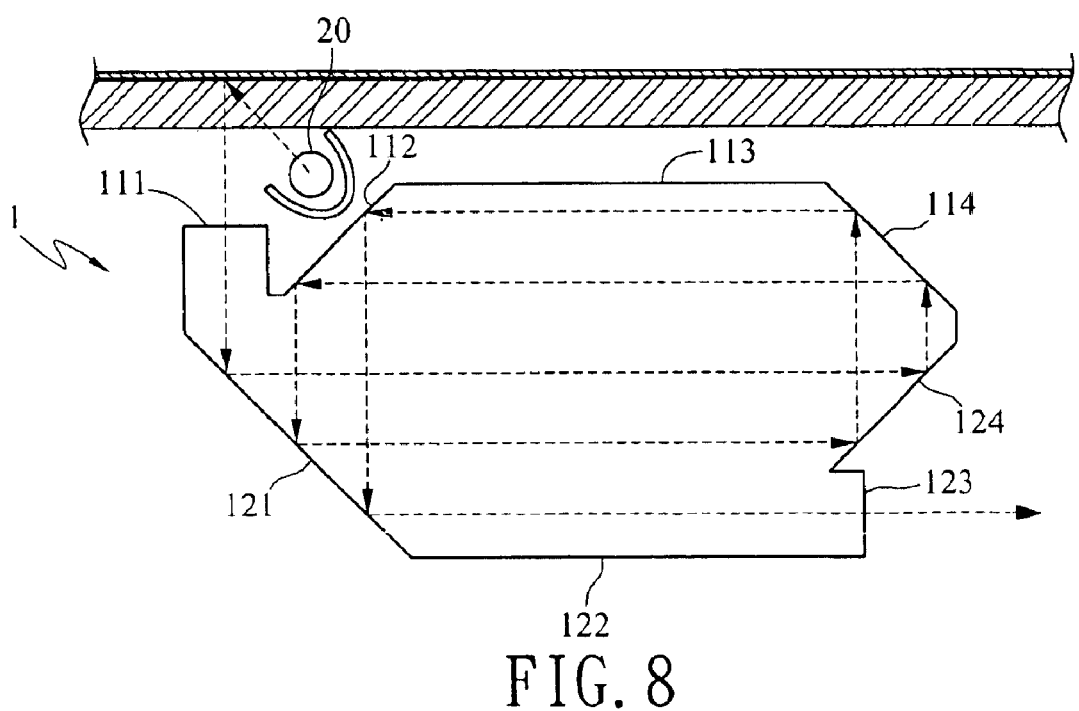
FIG. 8 shows how the fourth embodiment works.

FIG. 7 is a schematic view of a fourth embodiment of the invention, and FIG. 8 shows how the fourth embodiment works. From the drawings, one sees that the incident end 111 and the emergent end 123 can be either convex or planar, both achieving the same effects.

Certain variations would be apparent to those skilled in the art, which variations are considered within the spirit and scope of the claimed invention.

What is claimed is:

1. An optical device for a plane image input device, characterized in that: the optical device is associated with an illuminating source of the plane image input device and the optical device comprises a body which includes an incident end and an emergent end, wherein a light beam emitted by the illuminating source enters the body via the incident end, undergoes a total reflection, and emerges from the emergent end;

wherein the body includes the incident end, the emergent end, a first reflector, a second reflector, a third reflector, a fourth reflector, a first junction surface, and a second junction surface; the first reflector coupled to the incident end, the first reflector connected to the first junction surface at an angle of 135 degrees, the first junction surface connected with the emergent end, the second reflector connected to the emergent end, the second reflector coupled to the third reflector at an angle of 90 degrees, the second junction surface connected to each of the third reflector and to the fourth reflector at an angle of 135 degrees, and the fourth reflector connected to the incident end.

2. The optical device of claim 1, wherein the incident end is planar.

3. The optical device of claim 1, wherein the incident end is convex.

4. The optical device of claim 1, wherein the emergent end is planar.

5. The optical device of claim 1, wherein the emergent end is convex.

6. The optical device of claim 1, wherein the body comprises a first device coupled to a second device, the first device includes the incident end, the fourth reflector, the second junction surface, the third reflector, and a first touching surface, with the first touching surface connecting to the incident end and the third reflector, and the second device includes the first reflector, the first junction surface, the incident end, the second reflector, and a second touching surface, with the second touching surface connecting to the first reflector and the second reflector, the first touching surface of the first device touching against the second touching surface of the second device.

7. The optical device of claim 6, wherein the first touching surface includes a plurality of convex surfaces corresponding to the second touching surface which is flat.

8. The optical device of claim 6, wherein the second touching surface includes a plurality of convex surfaces corresponding to the first touching surface which is flat.

9. The optical device of claim 1, wherein the body is integral.

* * * * *